ics Co., Ltd.

(12) United States Patent
Zhang et al.

(10) Patent No.: US 7,427,888 B2
(45) Date of Patent: Sep. 23, 2008

(54) CHARGE PUMP CIRCUIT OPERATING RESPONSIVE TO A MODE

(75) Inventors: Pyung-Moon Zhang, Gyeonggi-do (KR); Seung-Keun Lee, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 69 days.

(21) Appl. No.: 10/888,667

(22) Filed: Jul. 8, 2004

(65) Prior Publication Data
US 2005/0007187 A1 Jan. 13, 2005

(30) Foreign Application Priority Data
Jul. 10, 2003 (KR) ............... 10-2003-0046799

(51) Int. Cl.
G05F 1/10 (2006.01)
(52) U.S. Cl. ......................... 327/536; 383/60
(58) Field of Classification Search ............... 327/536, 327/537, 143, 82, 60, 63; 363/60, 63, 59; 365/189.09
See application file for complete search history.

(56) References Cited

U.S. PATENT DOCUMENTS

| 5,099,143 | A | * | 3/1992 | Arakawa | 327/408 |
| 5,272,393 | A | * | 12/1993 | Horiguchi et al. | 327/535 |
| 5,335,200 | A | * | 8/1994 | Coffman et al. | 327/536 |
| 5,448,198 | A | * | 9/1995 | Toyoshima et al. | 327/530 |
| 5,483,486 | A | * | 1/1996 | Javanifard et al. | 365/185.17 |
| 5,717,581 | A | * | 2/1998 | Canclini | 363/60 |
| 5,751,142 | A | * | 5/1998 | Dosho et al. | 323/316 |
| 5,781,473 | A | * | 7/1998 | Javanifard et al. | 365/185.18 |
| 5,828,620 | A | * | 10/1998 | Foss et al. | 365/226 |
| 5,841,725 | A | * | 11/1998 | Kang et al. | 365/226 |
| 5,889,701 | A | * | 3/1999 | Kang et al. | 365/185.18 |
| 5,912,564 | A | * | 6/1999 | Kai et al. | 326/68 |
| 6,177,830 | B1 | * | 1/2001 | Rao | 327/536 |
| 6,429,725 | B1 | * | 8/2002 | Tanzawa et al. | 327/536 |
| 6,448,842 | B2 | * | 9/2002 | Zanuccoli et al. | 327/536 |

(Continued)

FOREIGN PATENT DOCUMENTS

JP 2001-35193 A * 2/2001

(Continued)

OTHER PUBLICATIONS

Machine translation of JP2001-35193A as provided by the JPO website http://dossier1.ipdl.inpit.go.jp/.*

(Continued)

*Primary Examiner*—N. Drew Richards
*Assistant Examiner*—Thomas J Hiltunen
(74) *Attorney, Agent, or Firm*—Marger Johnson & McCollom, P.C.

(57) ABSTRACT

Disclosed is a charge pump circuit that operates responsive to a test or general operation mode. The charge pump circuit includes at least one charge pump part. A voltage level sensing block generates a level sensing signal by sensing an output voltage. An oscillator generates complementary pulse signals responsive to the level sensing signal. And a selecting circuit block generates a selected voltage that is one of a high voltage and a supply voltage to the at least one charge pump part, the high voltage having a level higher than the supply voltage.

15 Claims, 7 Drawing Sheets

U.S. PATENT DOCUMENTS

| | | | |
|---|---|---|---|
| 6,522,191 B1 * | 2/2003 | Cha et al. | 327/536 |
| 6,552,600 B2 * | 4/2003 | Walimbe et al. | 327/536 |
| 6,654,290 B2 * | 11/2003 | Lee et al. | 365/185.23 |
| 6,876,247 B2 * | 4/2005 | Jang et al. | 327/536 |
| 6,954,386 B2 * | 10/2005 | Narui et al. | 365/189.11 |
| 2003/0056165 A1 | 3/2003 | Whetsel, Jr. | |
| 2004/0125524 A1 * | 7/2004 | Blyth | 361/100 |

FOREIGN PATENT DOCUMENTS

| | | |
|---|---|---|
| KR | 2002-0002541 | 1/2002 |

OTHER PUBLICATIONS

English language abstract of Korean Publication No. 2002-0002541.

* cited by examiner

CHARGE PUMP CIRCUIT OPERATING RESPONSIVE TO A MODE

BACKGROUND OF THE INVENTION

1. Priority Info This application claims priority from Korean Patent Application Number 2003-46799, filed Jul. 10, 2003, that we incorporate here by reference.

2. Field of the Invention

The present invention relates to high-voltage generators and, more specifically, to charge pump circuits operating responsive to a mode that enables selection of a power voltage or an external high voltage.

3. Discussion of the Related Art

Figure 1:
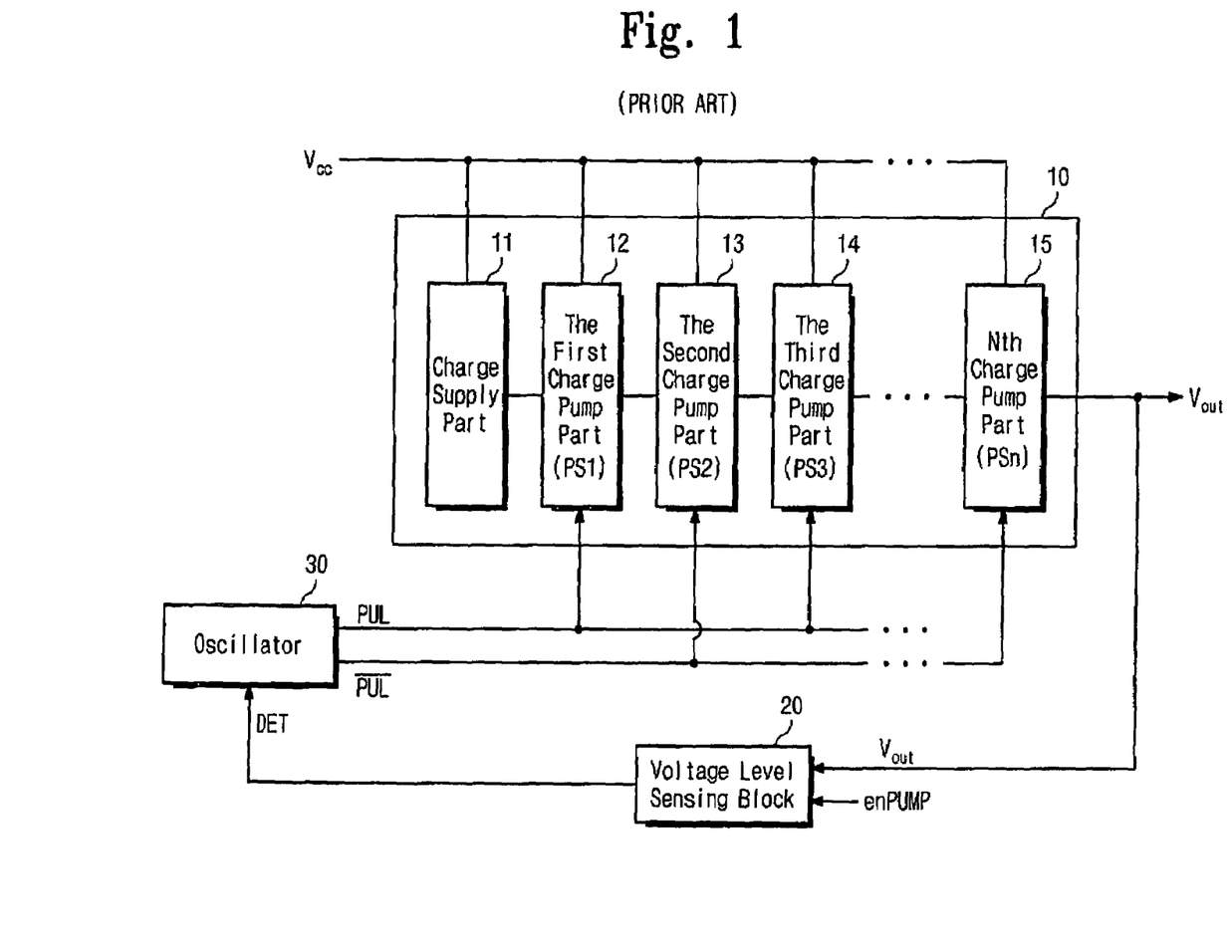
FIG. 1 is a block diagram of a conventional charge pump circuit.

FIG. 1 is a block diagram of a conventional charge pump circuit. As shown in FIG. 1, the conventional charge pump circuit comprises a voltage level sensing block 20, an oscillator 30, and a charge pump block 10. The voltage level sensing block 20 senses a level of the output voltage Vout. The oscillator 30 generates pulse signals PUL, /PUL responsive to a signal DET output from the block 20. The charge pump block 10 performs a pumping operation.

Figure 2:
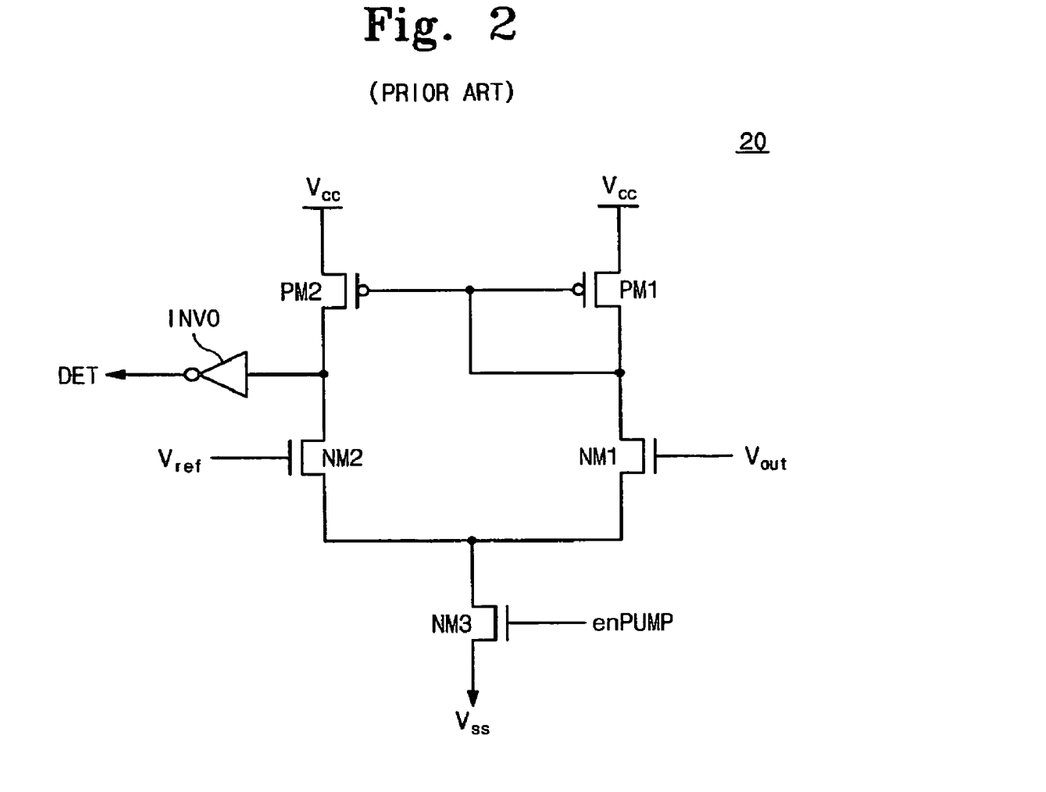
FIG. 2 is a circuit diagram of the sensing level sensing block 20 shown in FIG. 1.

The voltage level sensing block 20, as shown in FIG. 2, comprises a differential amplifier. The voltage level sensing block 20 operates responsive to a pumping enable signal enPUMP and compares output voltage Vout with reference voltage VREF. The voltage level sensing block 20 generates a level sensing signal DET.

Figure 3:
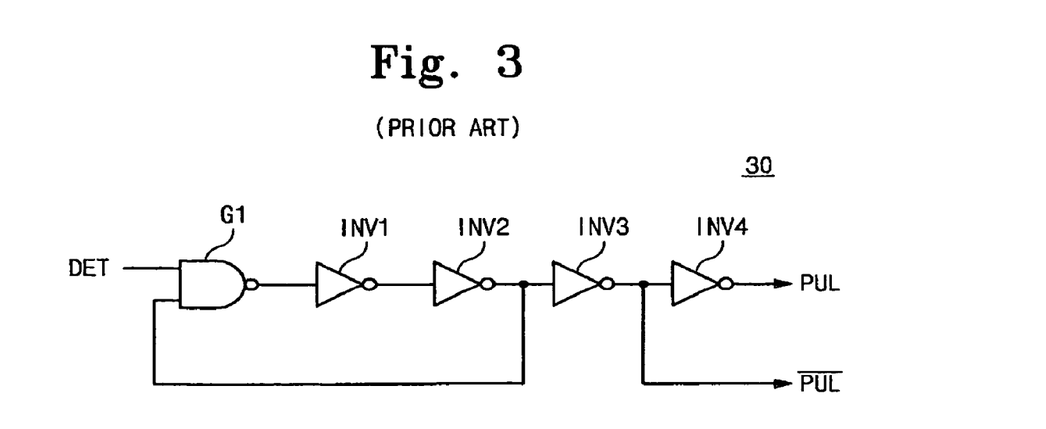
FIG. 3 is a circuit diagram of the oscillator 30 shown in FIG. 1.

As shown in FIG. 3, the oscillator 30 comprises one NOR gate G1 and four invertors INV1, INV2, INV3 and INV4. And the oscillator 30 responds to the level sensing signal DET to generate the complimentary pulse signals PUL, /PUL.

The charge pump block 10 comprises a charge supply part 11 and a plurality of charge pump parts 12-15. The charge supply part 11 receives an external voltage VCC and provides supply charges to a first charge pump part PSI. The charge pump parts PS1, PS2, PS3, . . . , PSn are serially connected. The charge pump parts 12-15 generate an output voltage Vout by pumping charges supplied from the charge supply part 11. An odd number of pump parts 11-15 operates responsive to the pulse signal PUL, while an even number of them operate responsive to the inverted pulse signal/PUL.

The conventional charge pump shown in FIG. 1 operates as follows.

When the pumping enable signal enPUMP is in a predetermined logic level, e.g., becomes high, the voltage level sensing block 20 senses the level of the output voltage Vout by comparing output voltage Vout to a reference voltage VREF. If the reference voltage VREF is larger than the output voltage Vout, the voltage level sensing block 20 generates the level sensing signal DET having a predetermined state, e.g., high. On the other hand, if the output voltage Vout is larger than reference voltage VREF, the voltage level sensing block 20 generates the level sensing signal DET having e.g., a low state. The oscillator 30 provides the pulse signals PUL and/PUL to the charge pump parts PS1, PS2, PS3, . . . , PSn responsive to the level sensing signal DET. That is, if the level sensing signal (DET) is enabled, all charge pump parts PS1, PS2, PS3, . . . , PSn increase the level of the output voltage Vout. If the level sensing signal (DET) is disable, all charge pump parts PS1, PS2, PS3, . . . , PSn decrease the level of the output voltage Vout.

The conventional charge pump circuit pre-charges the output voltage Vout corresponding to the external voltage VCC at each node of the charge supply part 11 and the charge pump parts 12-15. Accordingly, the time to precharge increases in the output voltage Vout. This additional time is undesired, particularly where testing integrated chips that require high voltages quickly. A need remains for an improved charge pump circuit.

SUMMARY

A feature of the invention is to address disadvantages associated with prior charge pumps.

Another feature of the invention is to provide a charge pump that operates both in a test and in a general operation mode.

A charge pump circuit includes at least one charge pump part. A voltage level sensing block generates a level sensing signal by sensing an output voltage. An oscillator 30 generates complementary pulse signals responsive to the level sensing signal. And a selecting circuit block generates a selected voltage that is one of a high voltage and a supply voltage to the at least one charge pump part, the high voltage having a level higher than the supply voltage.

BRIEF DESCRIPTION

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Reference will now be made in detail to embodiments of the present invention, examples of which are illustrated in the accompanying drawings. The present invention is, however, not limited to the embodiments illustrated here. Rather, the embodiments are introduced to provide easy and complete understanding of the scope and spirit of the present invention.

Figure 4:
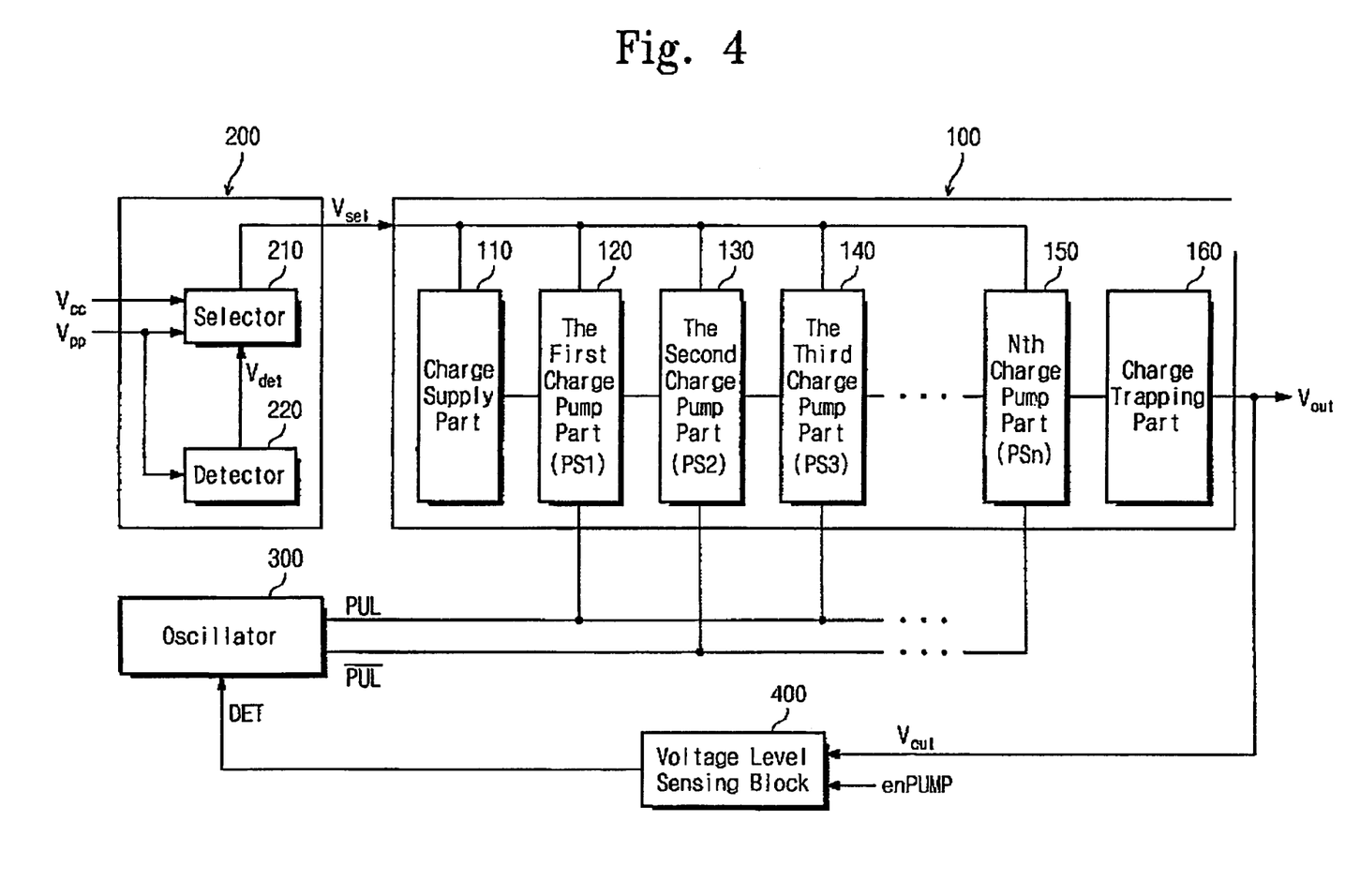
FIG. 4 is a block diagram of an embodiment of a charge pump circuit according to the present invention.

FIG. 4 is a block diagram of an embodiment of the charge pump circuit according to the present invention. Referring to FIG. 4, the charge pump circuit comprises a charge pump block 100, a selecting circuit block 200, an oscillator 300, and a voltage level sensing block 400.

The pump block 100 comprises a charge supply part 110, a plurality of charge pump parts 120, 130, 140, and 150 and a charge trapping part 160, all serially connected.

Figure 5:
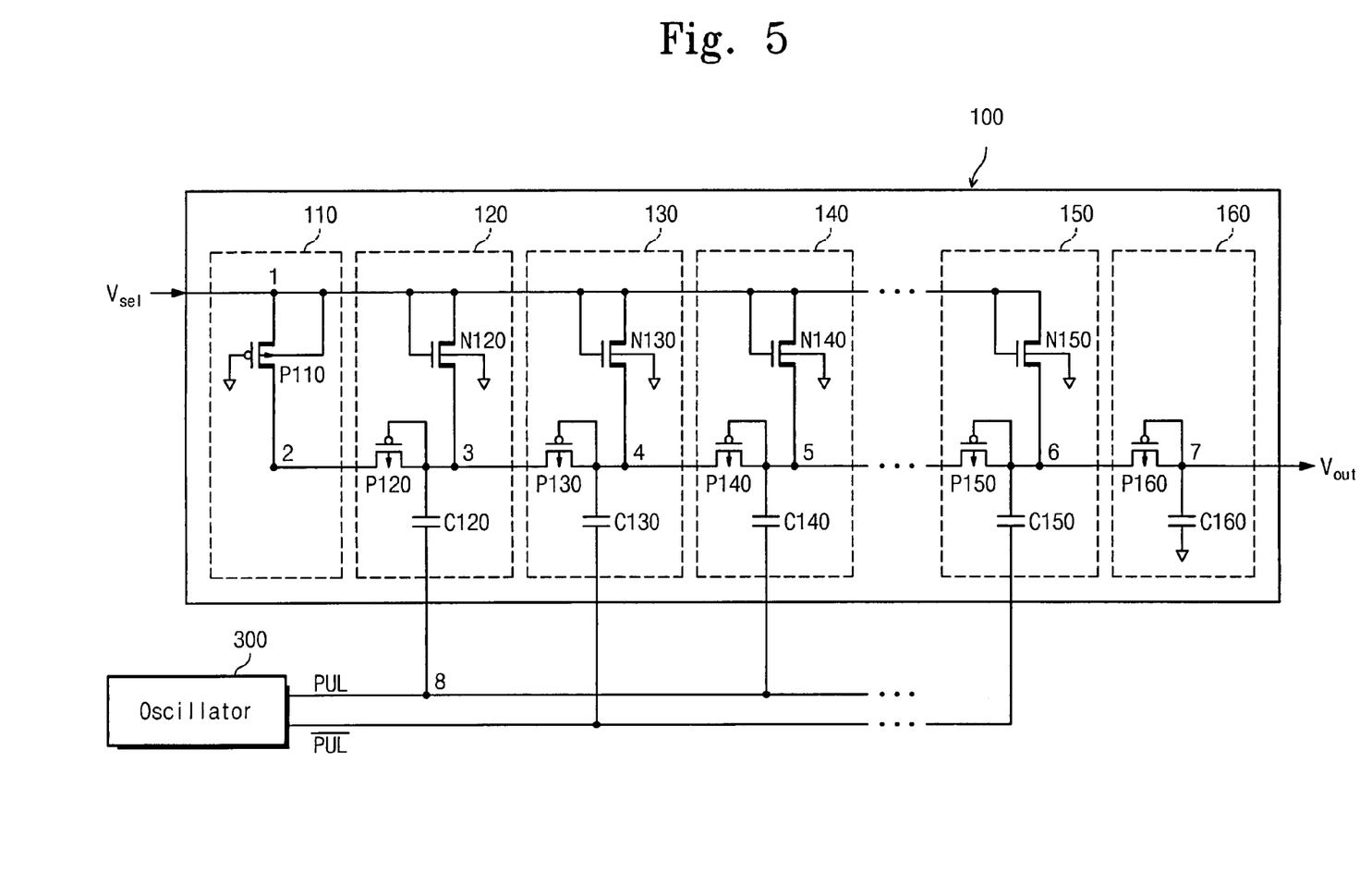
FIG. 5 is a circuit diagram of an embodiment of a charge pump part shown in FIG. 4.

The charge supply part 110 provides a charge corresponding to voltage Vsel provided, in turn, by the selecting circuit block 200 to a first charge pump part 120. The charge pump parts 120, 130, 140 and 150 pre-charge a charge corresponding to the selected voltage Vsel and pumps a charge to a next serially connected charge supply part. The charge trapping part 160 traps the pumped charge through each charge pump part 120, 130, 140 and 150 to generate an output voltage Vout. FIG. 5 is a block diagram of the charge pump block 100 shown in FIG. 4.

Referring to FIG. 5, the sensing level part 400 senses level of output voltage Vout when a pumping enable signal enPUMP is enabled. In other words, if the output voltage Vout is smaller than the reference voltage Vref, the level sensing signal DET is enabled. If the output voltage Vout is larger than the reference voltage Vref, on the other hand, the level sensing signal DET is disabled.

The oscillator 300 generates complementary pulse signals PUL and /PUL responsive to the level sensing signal DET. If the level sensing signal DET is enabled, all charge pump parts 120, 130, 140 and 150 increase the output voltage Vout. If the level sensing signal DET is disabled, the charge pump parts 120, 130, 140 and 150 do not operate.

Referring to FIG. 4, the charge pump circuit according to the present invention comprises a selecting circuit block 200. The selecting circuit block 200 includes a selector 210 and a detector 220. In the specification power supply voltage VCC refers to the power voltage operating in general operation mode. The voltage VPP refers to a high voltage provided externally during a test operation mode. The high voltage VPP may be applied externally in the test operation mode as well as during the general operation mode.

The selecting circuit block 200 comprises the selector 210 and the detector 220. The selector 210 selects between the power voltage VCC and the high voltage VPP. The detector 220 detects the level of the high voltage VPP to generate detection signal VDET. The detector 220 enables the detection signal VDET when the high voltage VPP is higher than the power voltage VCC. The selector 210 switches between the power voltage VCC to the high voltage VPP responsive to the detection signal VDET. Put differently, the signal VSEL is VCC in the general operation mode and VPP in the test operation mode allowing for a high voltage within a short time. The selector 210 and the detector 220 are more fully described referring to FIGS. 6 and 7.

FIG. 5 is a circuit diagram of the charge pump block 100 shown in FIG. 4. Referring to FIG. 5, the charge pump block 100 operates as follows. The charge pump block 100 comprises the charge supply part 110, charge pump parts 120, 130, 140 and 150, and the charge trapping part 160.

The charge supply part 110 comprises high-voltage PMOS transistor P110 available simultaneously in general and test operation modes. The high-voltage PMOS transistor P110 is connected between node 1 and node 2. Source and bulk terminals of the high-voltage PMOS transistor P110 are connected to the node 1. A drain terminal is connected to the node 2. A gate is connected to a ground GND terminal. The charge supply part 110 is available for a charge supply device and supplies charges to a first charge pump part 120 located in next part. For example, if VSEL is VCC in the general operation mode, charges corresponding to the power voltage VCC are pre-charged at node 2. In addition, if VSEL is VPP in test operation mode, charges corresponding to the high voltage VPP are pre-charged at node 2.

Each charge pump part 120, 130, 140 and 150 comprises one PMOS transistor, e.g., transistor P120, one capacitor, e.g., capacitor C120, and one high-voltage NMOS transistor, e.g., transistor N120. The high-voltage NMOS transistor, e.g., transistor N120, operates both in the general operation mode as well as the test operation mode. An odd number (or even number) of the charge pump parts operates responsive to the pulse signal PUL, while an even number (or odd number) of the charge parts operates responsive to the inverted pulse signal /PUL.

In the specification, pump parts except for the first charge pump part 120 is omitted for clarity. We describe only charge part 120 for simplicity. A person of reasonable skill should realize that other charge parts operate and include similar elements.

A source terminal of the PMOS transistor P120 is connected to the node 2. The source terminal of the PMOS transistor P120 is used as a charge transfer device. A drain terminal and a gate terminal are connected to the node 3. A bulk terminal is in a floating state. A capacitor C 120 is used as a charge pumping device and is connected between the node 3 and the node 8. The pulse signal PUL or/PUL is applied to the capacitor C120. The drain of the NMOS transistor N120 is connected to the node 1. A source terminal is connected to the node 3, and the bulk terminal is connected to ground GND. The gate and drain terminals of high-voltage NMOS transistor N120 are used as a pre-charge device. The high-voltage NMOS transistor N120 pre-charges charges corresponding to the selecting voltage VSEL at the node 3. For example, if the threshold voltage of the high-voltage NMOS transistor N120 is VTH, charges corresponding to VSEL-VTH are pre-charged. In other words, charges corresponding to VCC-VTH are pre-charged in the general operation mode, and charges corresponding to VPP-VTH are pre-charged in the test mode.

The charge trapping part 160 comprises one PMOS transistor P160 and one capacitor. The PMOS transistor P160 is used as charge transfer device, and the capacitor is used as charge trapping device. The charge trapping part 160 generates the output voltage Vout.

Figure 6:
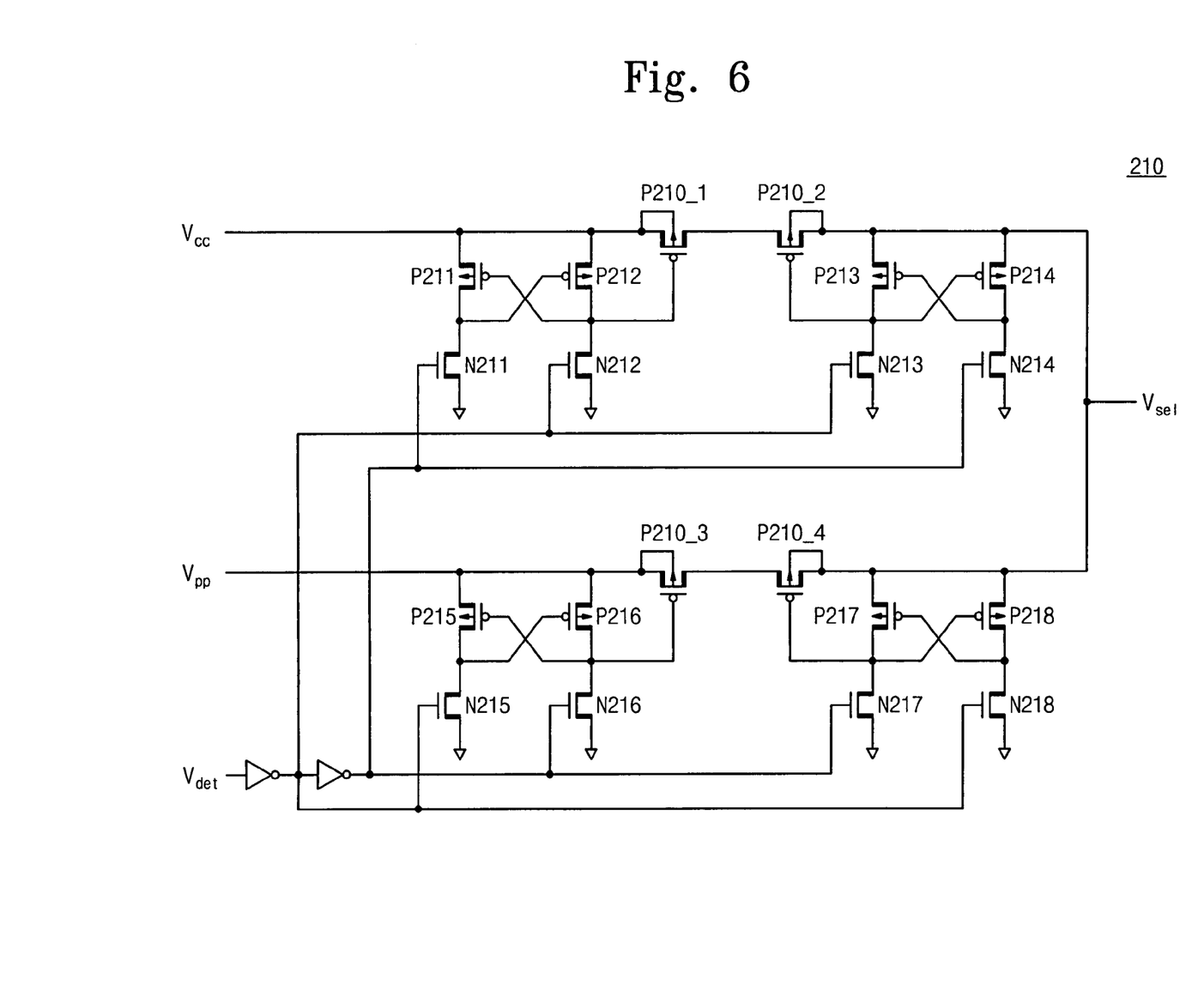
FIG. 6 is a circuit diagram of an embodiment of the selector shown in FIG. 4.

FIG. 6 is a circuit diagram of the selector 210 shown in FIG. 4. Referring to FIG. 6, the selector 210 uses a level shifter to control the high voltage VPP. The selector 210 comprises high-voltage NMOS transistors N211 to N218, high-voltage PMOS transistors P211 to P218 and P210_I where i=1 to 4, and two serially connected inverters. The level shifter selects between the power voltage VCC and the high voltage VPP. For instance, the high-voltage NMOS transistors N216 and N217 turn on in the test operation mode where the detection signal VDET is enabled. The high-voltage PMOS transistors P210_3 and P210_4 turn on. As a result, VSEL is equal to VPP. However, since the high-voltage NMOS transistors N212 and N213 are turned off, the high-voltage PMOS transistors P210_1 and P210_2 are also turned off. Accordingly, VSEL is not equal to VCC. To the contrary, VSEL is equal to VCC in general operation mode where the detection signal VDET is disabled.

Figure 7:
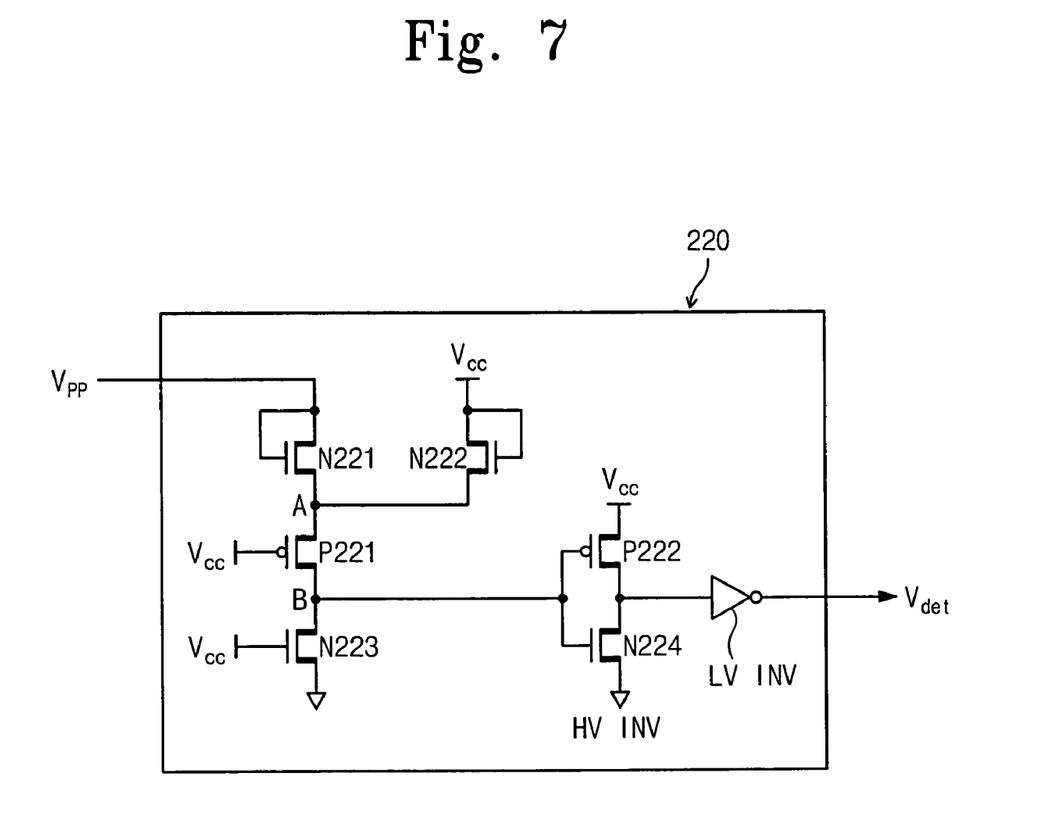
FIG. 7 is a circuit diagram of an embodiment of the detector shown in FIG. 4.

FIG. 7 is a circuit diagram of the detector 220 shown in FIG. 4. Referring to FIG. 7, the detector 220 comprises high-voltage PMOS transistors P221 and P222, high-voltage NMOS transistors N221-N224, a high-voltage inverter HV INV and a low-voltage inverter LV INV. The detector 220 can be used in the general as well as test operation mode requiring high voltage. For example, if external high-voltage VPP is lower than the power voltage VCC, a node A has a voltage that is VCC-VTH. Accordingly, the PMOS transistor P221 is off. At this time, node B voltage is ground GND. In another approach, if external high-voltage VPP is higher than the power voltage VCC, node A voltage is VPP-VTH. As VPP increases, node B has high enough voltage to inverse the output of the high-voltage inverter HV INV. This output generates a high detection signal VDET through passing the low-voltage inverter LV INV.

Figure 8:
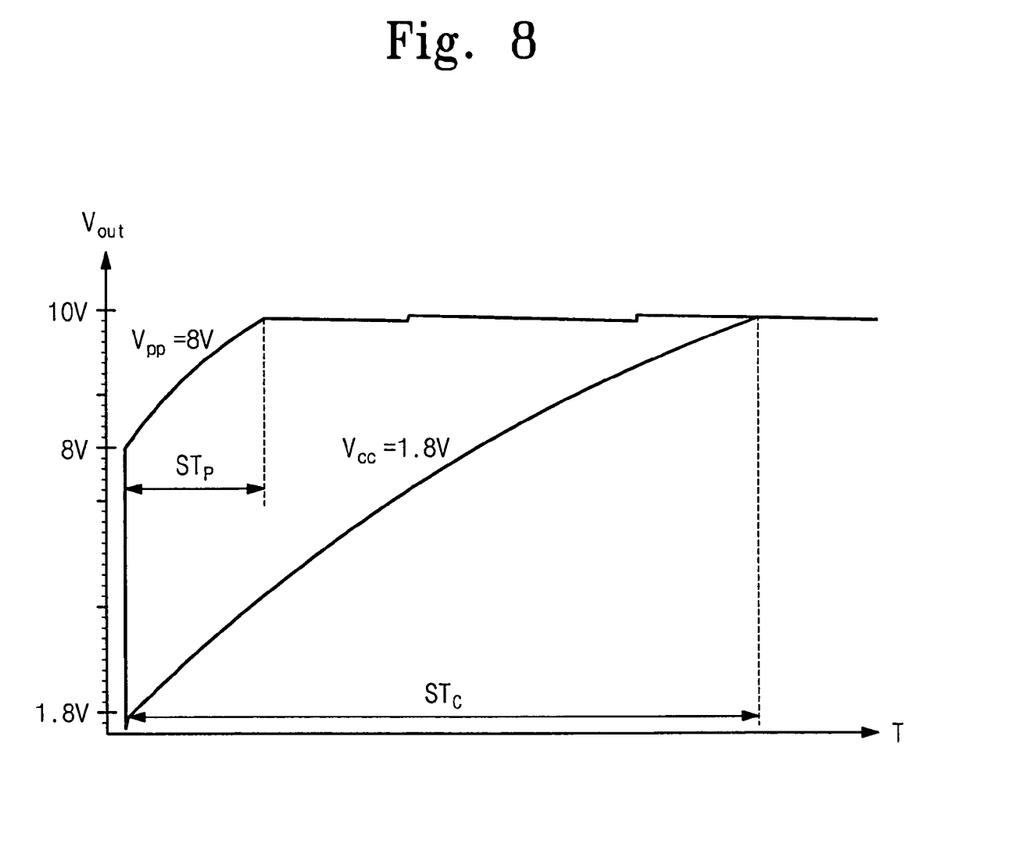
FIG. 8 is a graph of the output voltage for the charge pump circuit of the present invention.

FIG. 8 is a graph of the output voltage Vout depending on whether the charge pump circuit uses the power voltage VCC or external high voltage VPP. Settling time is a time required for the pumping operation to obtain a wanted output voltage Vout. Referring to FIG. 8, if the selected voltage VSEL is under the condition that the power voltage VCC is equal to 1.8V, and the external voltage VPP is equal to 8V, it is known that four times settling times (STp) is required to obtain an output voltage Vout of 10V. That is, when external high voltage VPP is supplied with the power voltage VCC, a wanted output voltage Vout can be obtained within a shorter time.

As previously mentioned, the charge pump circuit can obtain a wanted output voltage Vout within a short time by further including selective means capable of applying high voltage rather than the power voltage VCC.

It will be apparent to those skilled in the art that various modifications and variations can be made in the present invention. Thus, it is intended that the present invention covers the modifications and variations of this invention provided they come within the scope of the appended claims and their equivalents.

We claim the following:

1. A charge pump circuit comprising:
   a charge pump block including a plurality of charge pump parts, each charge pump part including at least one pre-charge device;
   a selector circuit coupled to the at least one pre-charge device of each of the charge pump parts, the selector circuit being structured to receive a supply voltage and a high voltage; and
   a detector circuit comprising a first node, a second node, a high voltage inverter, and a low voltage inverter, the high voltage inverter being coupled to the low voltage inverter, the first node being coupled to the supply voltage and the high voltage, the second node being coupled to an input of the high voltage inverter, the second node having a voltage high enough to invert an output of the high voltage inverter responsive to the high voltage being higher than the supply voltage, the low voltage inverter being configured to provide a detect signal to the selector circuit responsive to the inverted output of the high voltage inverter,
   wherein the detector circuit further comprises a first high voltage NMOS transistor coupled between the supply voltage and the first node and a second high voltage NMOS transistor coupled between the high voltage and the first node, the first node having a voltage of one of (a) a difference between the supply voltage and a threshold voltage of the first high voltage NMOS transistor and (b) a difference between the high voltage and a threshold voltage of the second high voltage NMOS transistor.

2. The charge pump circuit of claim 1, wherein the detector circuit further comprises a high voltage PMOS transistor coupled between the first node and the second node, the high voltage PMOS transistor having substantially an off state responsive to the first node having the voltage corresponding to the difference between the supply voltage and the threshold voltage of the first high voltage NMOS transistor, the detect signal indicating a general mode of operation responsive to the PMOS transistor having the off state.

3. The charge pump circuit of claim 1, wherein the second node has a high enough voltage to invert the output of the high voltage inverter responsive to the first node having the voltage corresponding to the difference between the high voltage and the threshold voltage of the second high voltage NMOS transistor, the detect signal indicating a test mode of operation responsive to the high enough voltage.

4. The charge pump circuit of claim 1,
   wherein the charge pump block is configured to generate an output voltage on an output terminal, the output terminal being coupled to the at least one pre-charge device of each of the plurality of charge pump parts; and
   wherein the selector circuit further comprises:
      a first inverter configured to receive the detect signal, an output terminal of the first inverter being coupled to a first node, the first node being coupled to gate terminals of first and second high voltage NMOS transistors;
      a second inverter, an input terminal of the second inverter being coupled to the first node, an output terminal of the second inverter being coupled to a second node, the second node being coupled to gate terminals of third and fourth high voltage NMOS transistors;
      at least one high voltage PMOS transistor coupled to the supply voltage, the at least one high voltage PMOS transistor having a gate terminal coupled to drain terminals of the first and third high voltage NMOS transistors;
      at least another high voltage PMOS transistor coupled to the high voltage, the at least another high voltage PMOS transistor having a gate terminal coupled to drain terminals of the second and fourth high voltage NMOS transistors; and
      an output terminal coupled to the high voltage PMOS transistors, wherein the detect signal controls a state of the first, second, third, and fourth high voltage NMOS transistors, and the high voltage NMOS transistors control a state of the high voltage PMOS transistors, the output terminal configured to transmit one of the supply voltage and the high voltage responsive to the state of the high voltage PMOS transistors.

5. The charge pump circuit of claim 1, wherein the charge pump block is configured to generate an output voltage on an output terminal, the output terminal being coupled to the at least one pre-charge device of each of the plurality of charge pump parts.

6. A charge pump circuit comprising:
   a charge pump block including a plurality of charge pump parts, each charge pump part including at least one pre-charge device;
   a selector circuit coupled to the at least one pre-charge device of each of the charge pump parts, the selector circuit being structured to receive a supply voltage and a high voltage; and
   a detector circuit comprising a first node, a second node, a high voltage inverter, and a low voltage inverter, the high voltage inverter being coupled to the low voltage inverter, the first node being coupled to the supply voltage and the high voltage, the second node being coupled to an input of the high voltage inverter,
   wherein the second node has a voltage high enough to invert an output of the high voltage inverter responsive to the high voltage being higher than the supply voltage, the low voltage inverter being configured to provide a detect signal to the selector circuit responsive to the inverted output of the high voltage inverter, and
   wherein the detector circuit further comprises a first high voltage NMOS transistor coupled between the supply voltage and the first node and a second high voltage NMOS transistor coupled between the high voltage and the first node.

7. The charge pump circuit of claim 6, wherein the first node has a voltage of one of (a) a difference between the supply voltage and a threshold voltage of the first high voltage NMOS transistor and (b) a difference between the high voltage and a threshold voltage of the second high voltage NMOS transistor.

8. The charge pump circuit of claim 7, wherein the detector circuit further comprises a high voltage PMOS transistor coupled between the first node and the second node, the high voltage PMOS transistor having substantially an off state responsive to the first node having the voltage corresponding to the difference between the supply voltage and the threshold voltage of the first high voltage NMOS transistor.

9. The charge pump circuit of claim 8, wherein the detect signal indicates a general mode of operation responsive to the PMOS transistor having the off state.

10. The charge pump circuit of claim 7 wherein the second node has a high enough voltage to invert the output of the high voltage inverter responsive to the first node having the voltage corresponding to the difference between the high voltage and the threshold voltage of the second high voltage NMOS transistor.

11. The charge pump circuit of claim 10, wherein the detect signal indicates a test mode of operation responsive to the high enough voltage.

12. A charge pump circuit, comprising:
   a charge pump block including a plurality of charge pump parts, each charge pump part including at least one pre-charge device;
   a selector circuit coupled to the at least one pre-charge device of each of the charge pump parts, the selector circuit being structured to receive a supply voltage and a high voltage; and
   a detector circuit comprising a first node, a second node, a high voltage inverter, and a low voltage inverter, the high voltage inverter being coupled to the low voltage inverter, the first node being coupled to the supply voltage and the high voltage, the second node being coupled to an input of the high voltage inverter, the second node having a voltage high enough to invert an output of the high voltage inverter responsive to the high voltage being higher than the supply voltage, the low voltage inverter being configured to provide a detect signal to the selector circuit responsive to the inverted output of the high voltage inverter, wherein the selector circuit further comprises:
   a first inverter configured to receive the detect signal, an output terminal of the first inverter being coupled to a first node, the first node being coupled to gate terminals of first and second high voltage NMOS transistors; and
   a second inverter, an input terminal of the second inverter being coupled to the first node, an output terminal of the second inverter being coupled to a second node, the second node being coupled to gate terminals of third and fourth high voltage NMOS transistors.

13. The charge pump circuit of claim 12, wherein the selector circuit further comprises:
   at least one high voltage PMOS transistor coupled to the supply voltage, the at least one high voltage PMOS transistor having a gate terminal coupled to drain terminals of the first and third high voltage NMOS transistors.

14. The charge pump circuit of claim 12, wherein the selector circuit further comprises:
   at least another high voltage PMOS transistor coupled to the high voltage, the at least another high voltage PMOS transistor having a gate terminal coupled to drain terminals of the second and fourth high voltage NMOS transistors.

15. The charge pump circuit of claim 14, wherein the selector circuit further comprises:
   an output terminal coupled to the high voltage PMOS transistors,
   wherein the detect signal controls a state of the first, second, third, and fourth high voltage NMOS transistors,
   wherein the high voltage NMOS transistors control a state of the high voltage PMOS transistors, and
   wherein the output terminal is configured to transmit one of the supply voltage and the high voltage responsive to the state of the high voltage PMOS transistors.

* * * * *